(12) United States Patent
Wu et al.

(10) Patent No.: US 8,438,307 B2
(45) Date of Patent: May 7, 2013

(54) METHOD AND DEVICE OF LOAD-SHARING IN IRF STACK

(75) Inventors: Pin Wu, Beijing (CN); Maoyong Jiang, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 430 days.

(21) Appl. No.: 12/787,794

(22) Filed: May 26, 2010

(65) Prior Publication Data
US 2011/0016243 A1  Jan. 20, 2011

(30) Foreign Application Priority Data

Jul. 16, 2009  (CN) .......................... 2009 1 0158006

(51) Int. Cl.
*G06F 15/173* (2006.01)
(52) U.S. Cl.
USPC .......................................... 709/239; 709/238

(58) Field of Classification Search .................. 709/238, 709/239
See application file for complete search history.

*Primary Examiner* — Larry Donaghue
*Assistant Examiner* — Marshall McLeod
(74) *Attorney, Agent, or Firm* — Marshall, Gerstein & Borun LLP

(57) ABSTRACT

The present invention provides a method and device of load-sharing in an IRF stack. The method includes: the Master device checking a congestion state of the main path, obtaining a path for forwarding service flow according the congestion state of the main path, where the path is the main path or a backup path, and forwarding the service flow to the egress device through the main path or the backup bath to implement the load-sharing in the IRF stack. In the embodiments of the present invention, by checking the congestion states of main path and the backup path in real-time, the load-sharing of the IRF stack is implemented. When new service flow is added, the data may be forwarded through another path, which can improve the efficiency of member devices in the IRF stack and solve the problem of forwarding bottleneck to which the member devices face.

14 Claims, 5 Drawing Sheets

METHOD AND DEVICE OF LOAD-SHARING IN IRF STACK

CROSS-REFERENCE TO RELATED APPLICATION

This application claims the priority benefit of Chinese Patent Application No. 200910158006M, filed Jul. 16, 2009, the entire disclosure of which is incorporated herein by reference.

FIELD OF THE INVENTION

The present invention relates to the communication technology field, and more particularly to a method and device of load-sharing in an IRF stack.

BACKGROUND OF THE INVENTION

In an Intelligent Resilient Framework (IRF) stack, multiple devices are connected together via stack ports to form a combination device, and a user device manages the combination device, so as to manage all the devices in the IRF stack. In an IRF stack, a single device is called as a member device, and all member devices may be centralized devices or distributed devices, as long as types of the member devices in the same IRF stack are compatible with each other. In the IRF stack, a Master device is one of the member devices, is obtained by role vote and is in charge of managing the whole IRF stack. Only one member device may become the Master device at one time in one stack. A Slave device is one of the member devices, is obtained by role vote, is subject to the Master device, and operates as a backup device of the Master device. In one stack, all devices are Slave devices except the Master device, i.e. there may be multiple Slave devices in the stack. The IRF stack mainly have the following advantages: (1) reducing management; after the IRF stack is formed, a user device may log on the IRF stack by connecting to any port of any member device, which is equivalent to directly logging on the Master device in the IRF stack, and the user device may manage the whole IRF stack and all devices in the IRF stack by configuring the Master device without physically connecting to each member device, distributing IP addresses for the member devices, intercommunicating with the member devices, running router protocols and so on; (2) having a strong network extended capability; the number of ports, bandwidth and processing capability of the IRF stack may be extended easily by adding member devices; (3) having high reliability; the high reliability of the IRF stack may be incarnated by multiple aspects; for example, the IRF stack includes multiple member devices, and the Master device is in charge of operations, managements and maintenances of the IRF stack while the Slave devices may process services when being backups; once the Master device is in failure, the IRF stack will automatically and rapidly vote a new Master device, so as to guarantee that the services of the IRF stack are not interrupted; the physical stack ports between the member devices support an aggregation function, and physical connections between the IRF stack and upper layer devices and between the IRF stack and lower layer devices also support the aggregation function, so that the reliability of the IRF stack is improved by a multi-link backup.

In the IRF stack, the member devices need to be physically connected with each other to make the IRF stack operate normally. A physical port used to a stack connection in a member device is call as a physical stack port, and the physical stack port can not be used in the stack connection unless the physical stack port is bound with a logic stack port (called as a stack port for short). The bound physical stack port can receive and send negotiation messages related to the IRF stack or forward service messages between the member devices.

Specifically, there are two types of connection topology of the physical stack port, including a chain connection and a ring connection. FIG. 1 shows a topology structure of a ring connection. The ring connection is more reliable than the chain connection. When one link in the ring connection is in failure, the function and performance of the IRF stack will not be influenced, while when one link in the chain connection is in failure, the IRF stack will split.

According to the above description, the currently used IRF stack has following disadvantages.

In the IRE stack technologies, when non-broadcast flow is forwarded across a device by using a ring stack, in order to make the overhead in the forwarding process minimal, a critical path method is usually adopted. However, when data are transmitted by using the critical path method, load-sharing can not be performed for the flow. For example, when two devices perform the ring stack, one stack path can only be used as a backup, and thus resources are wasted; when multiple devices perform the ring stack, a stress on flow is brought to direct-connected stack members because of the use of fixed forwarding paths, the flow on the fixed forwarding paths can not be split, and thus a transmitting bottleneck is caused on the fixed forwarding paths. It is taken as an example that the data are transmitted in the ring stack according to the critical path method, as shown in FIG. 2. In FIG. 2, a fixed forwarding path from a Switch 1 to a Switch 5 is from a P1/1 port, to a P4/1 port, to a P4/2 port and to a P5/2 port, and a fixed forwarding path from the Switch 1 to a Switch 4 is from the P1/1 port to the P4/1 port. When there are a large number of data needing to be transmitted from the Switch 1 to the Switch 4, the data are transmitted to the Switch 4 through the path from the P1/1 port to the P4/1 port, and thus a great stress on flow is brought to the path from the P1/1 port to the P4/1 port; at the same time, when there are data needing to be transmitted from the Switch 1 to the Switch 5, the fixed path between the Switch 1 and the Switch 5, i.e. the path from the P1/1 port, to the P4/1 port, to the P4/2 port and to the P5/2, is used to transmit the data. Since there are a large number of data between the P1/1 port to the P4/1 port and a large amount of bandwidth is occupied, the data can not be transmitted to the Switch 5 or the data may be lost during the transmitting process. In other words, when the load on the path from the P1/1 port to the P4/1 port reaches the maximum, the transmitting bottleneck will be caused when newly added flow is transmitted from the Switch 1 to the Switch 4 or from the Switch 1 to the Switch 5, and the data can not be forwarded by using other paths.

SUMMARY OF THE INVENTION

Embodiments of the present invention provide a method and device of load-sharing, to automatically proportion residual bandwidth of each path on the premise of guaranteeing the forwarding efficiency, so that flow is distributed uniformly.

A method of load-sharing in an IRF stack is applied to a system including a Master device, an ingress device and an egress device, where the ingress device is an IRF stack member for receiving service flow, the egress device is an IRF stack member for sending the service flow, and a critical forwarding path between the ingress device and the egress device is a main path, and other paths is backup paths. The method includes:
  checking, by the Master device, a congestion state of the main path;
  obtaining, by the Master device, a path for forwarding the service flow according the congestion state of the main path, and the path being the main path or a backup path; and
  forwarding, by the Master device, the service flow to the egress device through the main path or the backup bath to implement the load-sharing in the IRF stack.

A device of load-sharing in an IRF stack is applied to a system including a Master device, an ingress device and an egress device, where the ingress device is an IRF stack member for receiving service flow, the egress device is an IRF stack member for sending the service flow, and a critical forwarding path between the ingress device and the egress device is a main path, and other paths is backup paths. The device includes:
  a checking module, adapted to check a congestion state of the main path;
  an obtaining module, electrically connected with the checking module and adapted to obtain a path for forwarding the service flow according to the congestion state of the main path checked by the checking module, the path being the main path or a backup path; and
  a receiving-sending module, electrically connected with the obtaining module and adapted to forward the service flow to the egress device through the main path or the backup path obtained by the obtaining module to implemented the load-sharing in the IRF stack.

Compared with the prior art, the present invention has the following advantages: load-sharing in the IRF stack is implemented by checking the congestion state on the main path and the congestion state on the backup path in real-time; when new service flow is added, data can be forwarded through another path, which can improve the efficiency of member devices in the IRF stack, and solve the problem of the forwarding bottleneck to which the member devices face.

DETAILED DESCRIPTION OF THE INVENTION

The idea of the present invention includes: congestion states of a main path and a backup path are checked in real-time; when the main path is not congested, the main path is selected to forward service flow; when the main path is congested and the backup path is not congested, the backup path is selected to forward the service flow, so as to implement load-sharing in an IRF stack. When new service flow is added, data may be forwarded through another path, which can improve the efficiency of member devices in the IRF stack, and solve the problem of forwarding bottleneck to which the member devices face.

Figure 1:
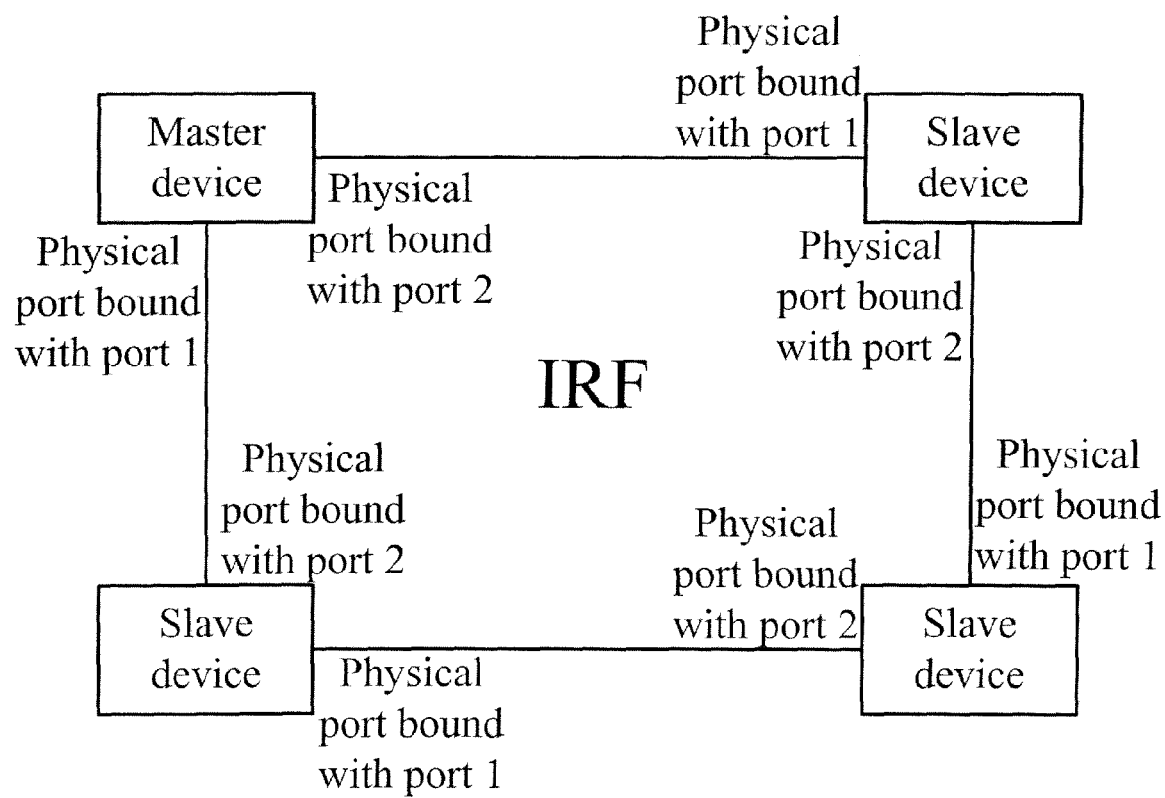
FIG. 1 is a schematic diagram illustrating an IRF stack with a topology structure of a ring connection in the prior art.
Figure 2:
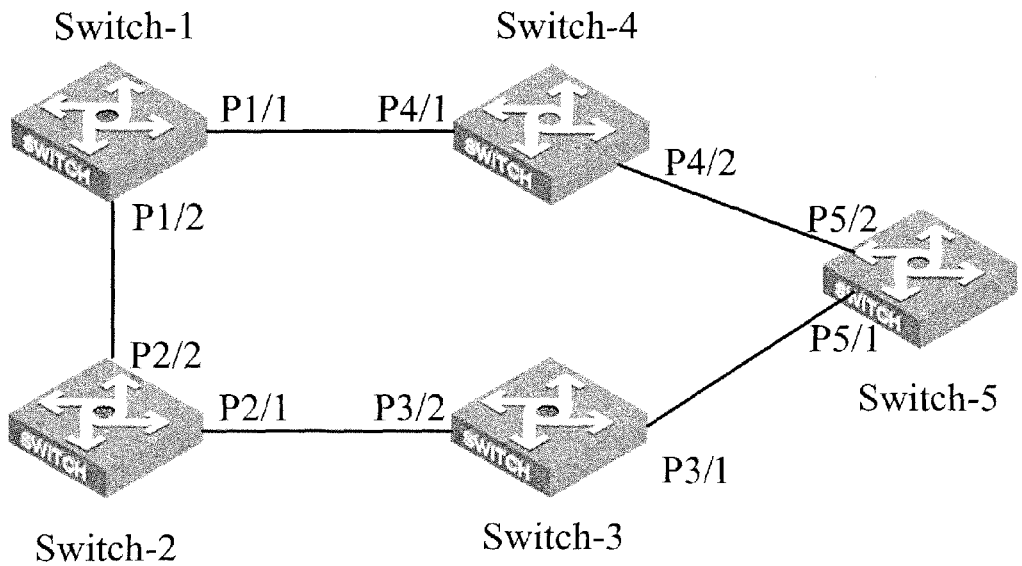
FIG. 2 is a schematic diagram illustrating that data are transmitted in a ring stack according to a critical path method in the prior art.
Figure 3:
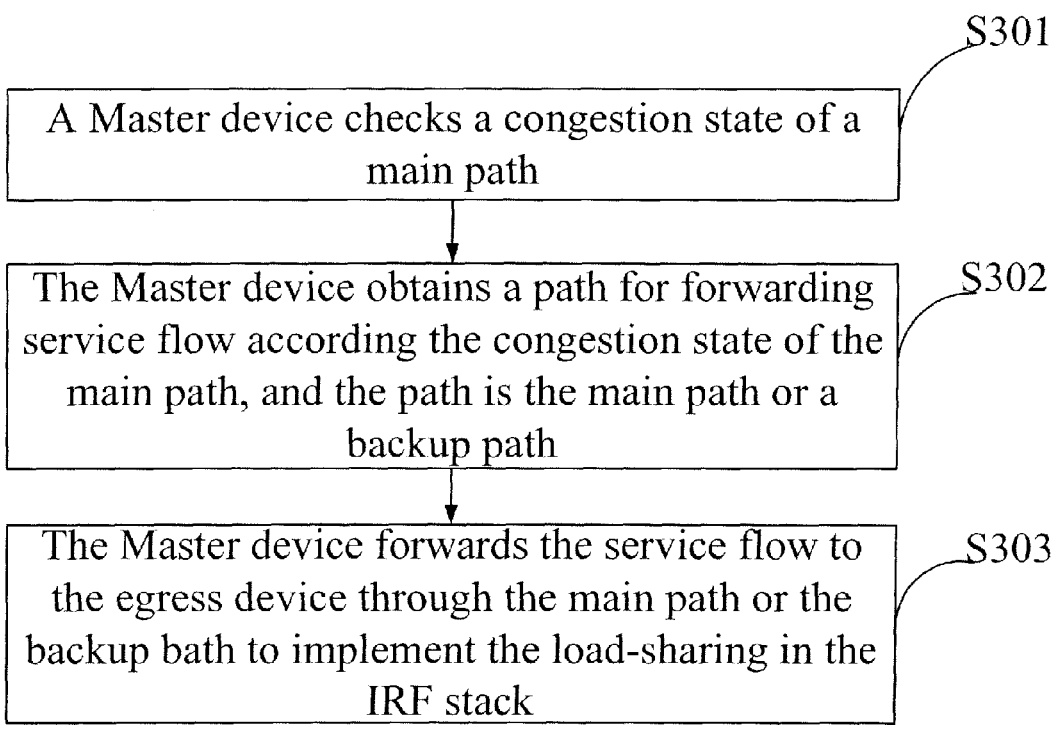
FIG. 3 is a flowchart illustrating a method of load-sharing in an IRF stack in accordance with an embodiment of the present invention.

The embodiments of the present invention provide a method of load-sharing in an IRF stack, which is applied to a system including a Master device, an ingress device and an egress device. The ingress device is an IRF stack member for receiving service flow, the egress device is an IRF stack member for sending the service flow, a critical forwarding path between the ingress device and the egress device is a main path, and other paths are backup paths. As shown in FIG. 3, the method includes the following steps.

Step S301: A Master device checks a congestion state of a main path.

It should be noted that, when a forwarding table of the service flow is stored in the IRF stack, the Master device determines the main path and the backup paths according to the ingress device and the egress device recorded in the forwarding table; or when the forwarding table of the service flow is not stored in the IRF stack, the Master device obtains the ingress device and the egress device according to the service flow, determines the main path and the backup paths according to the ingress device and the egress device, and stores the forwarding table of the service flow in the IRF stack.

The Master device checking the congestion state of the main path includes that: the Master device obtains current bandwidth of the main path, where the current bandwidth is minimum residual bandwidth of all logic stack ports on the main path; the Master device compares the current bandwidth and a preset main forwarding threshold, determines the congestion state of the main path according to a comparing result; when the current bandwidth is larger than the main forwarding threshold, the congestion state of the main path indicates that the main path is not congested; otherwise, the congestion state of the main path indicates that the main path is congested.

Step S302: The Master device obtains a path for forwarding the service flow according the congestion state of the main path, and the path is the main path or a backup path.

Specifically, the Master device obtaining the path for forwarding the service flow according the congestion state of the main path includes that: when the congestion state of the main path indicates that the main path is not congested, the Master device obtains the main path as the path for forwarding the service flow; when the congestion state of the main path indicates that the main path is congested, the Master device obtains the path for forwarding the service flow according to the congestion state of the backup path.

The Master device obtaining the path for forwarding the service flow according to the congestion state of the backup path includes that: the Master device obtains current bandwidth of the backup path, compares the current bandwidth of the backup path and a preset secondary forwarding threshold, determines the congestion state of the backup path according to a comparing result; when the current bandwidth of the backup path is larger than the secondary forwarding threshold, the congestion state of the backup path indicates that the backup path is not congested, the Master device obtains the backup path as the path for forwarding the service flow; otherwise, the congestion state of the backup path indicates that the backup path is congested, and the Master device obtains the main path as the path for forwarding the service flow.

In should be noted that, after the Master device obtains the backup path as the path for forwarding the service flow, the method further includes that: the Master device obtains the current bandwidth of the main path according to a preset cycle; when the current bandwidth of the main path is larger than the preset main forwarding threshold, the Master device calculates the difference between the current bandwidth of the main path and the preset main forwarding threshold; the Master device compares minimum service flow among the service flow on the backup path and the difference; if the minimum service flow is smaller than the difference, the Master device switches the minimum service flow on the backup path to the main path.

Further, after the Master device obtains the backup path as the path for forwarding the service flow, the method further includes that: when the current bandwidth of the backup path equals to a preset first value, the Master device switches the minimum service flow on the backup path to the main path until the current bandwidth of the backup path equals to a preset second value or there is no service flow on the backup path.

Step S303: The Master device forwards the service flow to the egress device through the main path or the backup bath to implement the load-sharing in the IRF stack.

As can be seen, in the present invention, the congestion states of the main path and the backup path are checked in real-time; when the main path is not congested, the main path is selected to forward the service flow; when the main path is congested and the backup path is not congested, the backup path is selected to forward the service flow; and thus the load-sharing in the IRF stack is implemented. When new service flow is added, the data can be forwarded through another path, which can improve the efficiency of the member devices in the IRF stack, and solve the problem of the forwarding bottleneck to which the member devices face.

Figure 4:
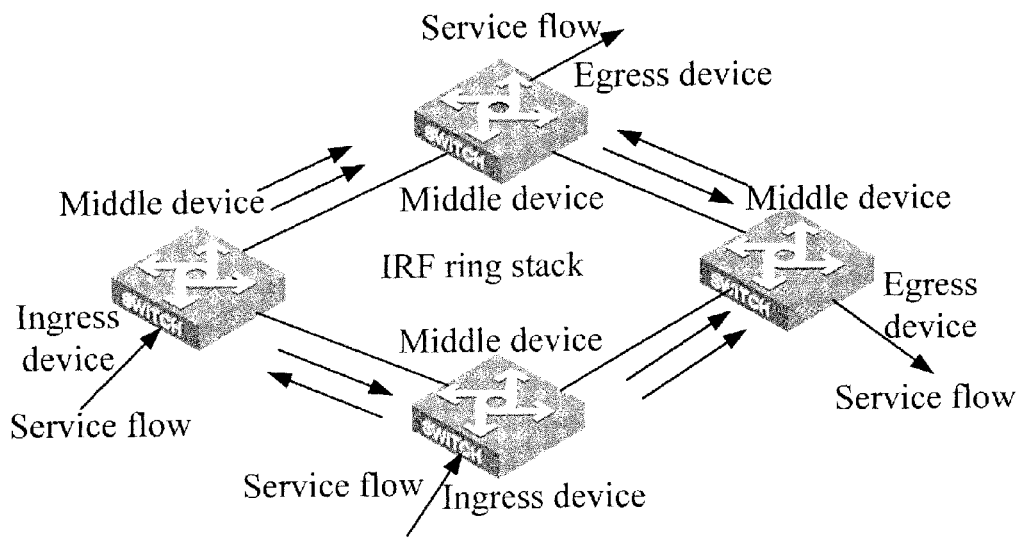
FIG. 4 is a schematic diagram illustrating a forwarding mode in a ring stack in accordance with an embodiment of the present invention.

The present invention provides a method of load-sharing in an IRF stack for an application screen. The method of the load-sharing in the IRF stack is applied to networking using the IRF technology. FIG. 4 shows a forwarding mode in a ring stack. In the present invention, a member device for receiving service flow is called as an ingress device, a member device for sending the service flow is called as an egress device, and member devices between the ingress device and the egress device are called as middle devices. The number of the middle devices may be determined according to the topology structure of the IRF stack, i.e. there may be multiple middle devices according to practical requirements. It should be noted that, the ingress device, the middle devices and the egress device are defined based on service flow forwarding, and in the IRF stack, one stack member may pluralize three roles at the same time, i.e. the ingress device, the middle device and the egress device.

Figure 5:
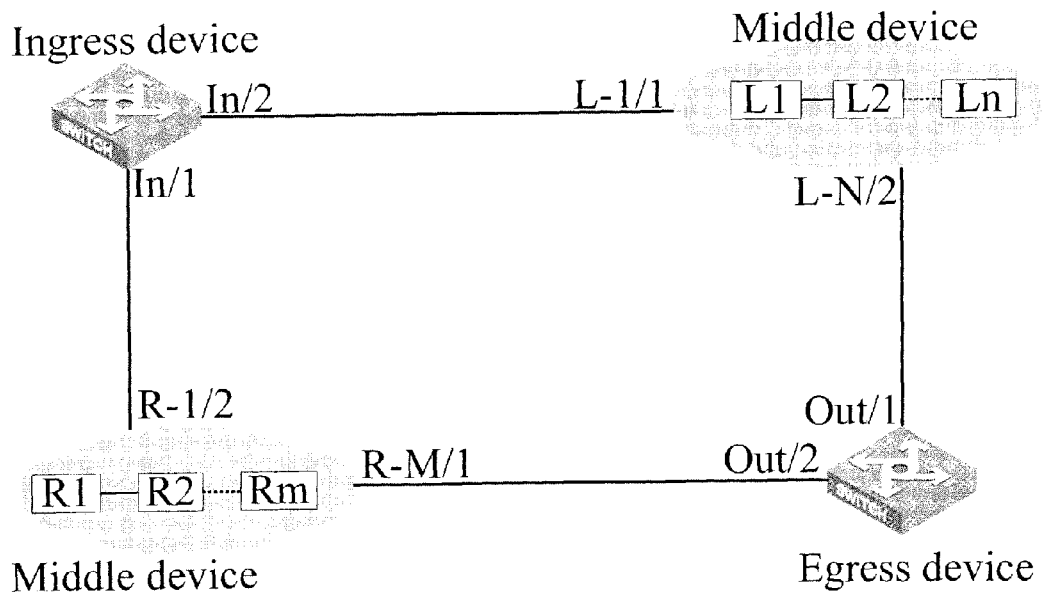
FIG. 5 is a schematic diagram illustrating a networking mode for an application scene in accordance with an embodiment of the present invention.

In the present invention, in order to describe expediently, the networking mode shown in FIG. 5 is taken as an example to describe the method of load-sharing in the IRF stack. In FIG. 5, there are an ingress device and an egress device. Two stack ports of the ingress device are In/1 and In/2, and two stack ports of the egress device are Out/1 and Out/2. The stack ports of the ingress device need to connect with the egress device through the middle devices, and the number of the middle devices is different in different topology structures.

Specifically, the stack ports of each device (the ingress device, the egress device and the middle devices) are a port 1 and a port 2. The stack port of one member device, which is bound with the port 1, can only connect with the stack port of a neighbor member device, which is bound with the port 2; otherwise, the IRF stack can not be formed. For example, L1/2 connects with L2/1, where L1 represents a first device of the left ring, /2 represents the port 2 of the first device, L2 represents a second device of the left ring, and /1 represents the port 1 of the second device. Accordingly, in the present invention, the port 1 of the ingress device (In/1) needs to connect with the port 2 of a first device of the right ring (R1/2) (or the port 1 of the ingress device (In/1) connects with a first device of the left ring, here the first device of the right ring is taken as an example), and the port 1 of the first device of the right ring (R1/1) needs to connect with the port 2 of a second device of the right ring (R2/2); the rest may be deduced by analogy, the port 1 of the $(M-1)^{th}$ device of the right ring (R M-1/1) needs to connect with the port 2 of the $M^{th}$ device of the right ring (R M/2), and the port 1 of the $M^{th}$ device of the right ring (R M/1) needs to connect with the port 2 of the egress device (Out/2), so that the ingress device and the egress device are connected through the right ring of the IRF stack. Similarly, the port 2 of the ingress device (In/2) needs to connect with the port 1 of the first device of the left ring (L1/1); the rest may be deduced by analogy, the port 2 of the $N^{th}$ device of the left ring (L N/2) needs to connect with the port 1 of the egress device (Out/1), so that the ingress device and the egress device are connected through the left ring of the IRF stack.

It should be noted that, in the present invention, the logic stack ports for forwarding service flow in the IRF stack are used to describe the forwarding paths (the port 1 and the port 2 in the above description are both logic stack ports). The logic stack ports for forwarding the service flow do not include the logic stack ports for receiving the service flow. For example, the above R1/2 is the logic stack port for receiving the service flow, while the above R1/1 is the logic stack port for forwarding flow, i.e. R1/1 is used to describe the forwarding path instead of the R1/2.

Accordingly, in the present invention, the path between the ingress device and the egress device includes: (1) a path from In/1 to R1/1 to R2/1 . . . to R M/1 to Out/2; (2) a path from In/2 to L1/2 to L2/2 . . . to L N/2 to Out/1. In order to make the forwarding path minimum, it is needed to obtain the main path and the backup path according to the values of M and N. When the value of M is larger than the value of N, the path corresponding the value of N, i.e. the path from In/2 to L1/2 to L2/2 . . . to L N/2 to Out/1 is the main path; when the value of M is smaller than the value of N, the path corresponding the value of M, i.e. the path from In/1 to R1/1 to R2/1 . . . to R M/1 to Out/2 is the main path. That is, the length of the main path must be smaller than the length the backup path. Of course, if the value of M is the same as the value of N, the main path and the backup path may be selected according to practical requirements, and this case is not described here.

In the present invention, it is taken as an example that the value of M is larger than the value of N. For example, if the value of M is 6 and the value of N is 5, the number of the middle devices in the right ring of the ingress device is 6, the number of the middle devices in the left ring of the ingress device is 5, and thus the length of the middle devices in the right ring is larger than that of the middle devices in the left ring, i.e. the path corresponding to the middle devices in the left ring is selected as the main path. Therefore, the main path is from In/2 to L1/2 to L2/2 . . . to L N/2 to Out/1, and the backup path is from In/1 to R1/1 to R2/1 . . . to R M/1 to Out/2.

It should be noted that, one logic stack port (the above port 1 or port 2) may be bound with one physical stack port or multiple physical stack ports to realize a link backup (here, the logic stack port is called as an aggregation stack port). The support state of the aggregation stack port relates to the type of the device, and the aggregation stack port can be selected according to practical requirements, which will not be further described here. The physical stack ports may connect with each other with special lines, or with optical fiber, which will not be further described here.

Figure 6:
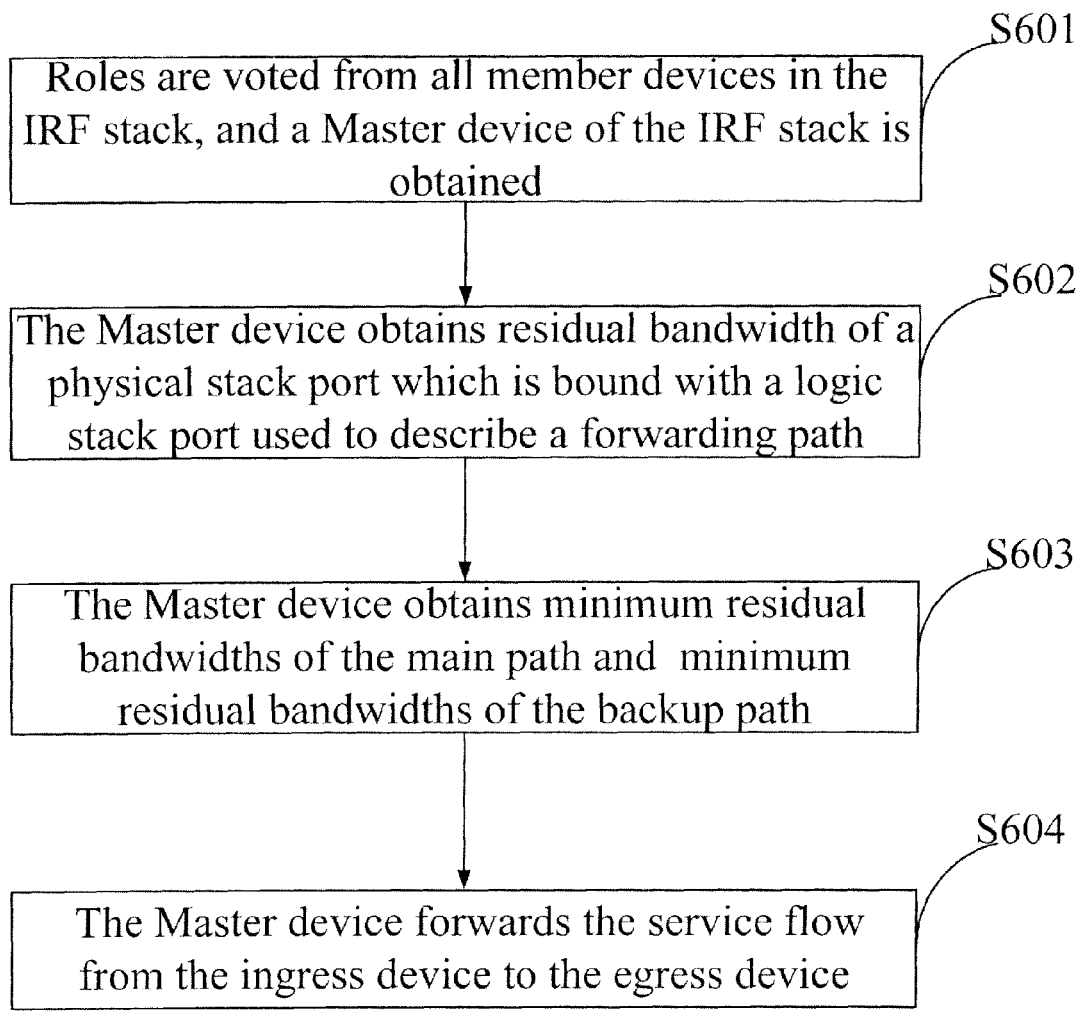
FIG. 6 is a flowchart illustrating a method of load-sharing in an IRF stack when the networking mode show in FIG. 5 is applied in accordance with an embodiment of the present invention.

FIG. 6 shows a method of load-sharing in an IRF stack when the application screen show in FIG. 5 is applied. The method includes the following steps.

Step S601: Roles are voted from all member devices in an IRF stack, and a Master device of the IRF stack is obtained. Where, the Master device is in charge of managing the whole IRF stack, and there is merely one Master device in the IRF stack at one time.

Step S602: The Master device obtains residual bandwidth of a physical stack port which is bound with a logic stack port used to describe a forwarding path. When there is one physical stack port bound with the logic stack port, the Master device obtains the residual bandwidth of the physical stack port; when there are multiple physical stack ports bound with the logic stack port, the Master device obtains the total residual bandwidth of the multiple physical stack ports.

In the present invention, the Master device obtains the residual bandwidth of the physical stack port according to a preset cycle. The preset cycle is selected randomly according to practical requirements. For example, when learning that jitter of the IRF stack is smooth, the Master device may set a longer the preset cycle according to practical requirements (e.g. the Master device obtains the residual bandwidth of the physical stack port every one minute); otherwise, the Master device may set a shorter the preset cycle (e.g. the Master device obtains the residual bandwidth of the physical stack port every 5 minutes)

It should be noted that, since the Master device can manage all devices in the IRF stack, the Master device may directly obtain the residual bandwidth of the physical stack port. Of course, according to practical requirements, each member device may obtain its own residual bandwidth of the physical stack port, and sends the information about the residual bandwidth of the physical stack port to the Master device. It is taken as an example that the Master device directly obtains the residual bandwidth of the physical stack port.

The modes of obtaining the residual bandwidth of the physical stack port by the Master device include, but are not limited to, the following modes. (1) For each logic stack port on the forwarding path, the Master device timely accounts average bandwidth use rate of all physical stack ports corresponding to out-direction of the logic stack port according to the cycle (the value of the timer may be configured according to practical requirements to suit for different network characters), and calculates the residual bandwidth of the physical stack ports according to the average bandwidth use rate. Specifically, at a certain statistic moment, the Master device obtains the bandwidth use rate of each physical stack port among K physical stack ports, which are respectively N1%, N2%, N3%, . . . NK %, and thus the current average bandwidth use rate of all the physical stack ports is uRate=(N1%+N2%+N3%+. . . +NK %)/K. Further, the residual bandwidth of the logic stack port is calculated, which equals to the total bandwidth of all the physical stack ports*(1−uRate). For example, the logic stack port In/1 of the ingress device is bound with four physical stack ports, and the bandwidth which can be used by each physical stack port is 100M. At a certain statistic moment, the bandwidth use rates of the four physical stack ports obtained by the Master device are respectively 20%, 40%, 30% and 30%, and then the average bandwidth use rate of the current four physical stack ports is uRate=(20%+40%+30%+30%)/4, i.e. the uRate is 30%. Further, the total residual bandwidth is calculated, which equals to 4*100M* (1−30%)=280M. Where, the 4*100M is the total bandwidth of the 4 physical stack ports. (2) For each logic stack port on the forwarding path, the Master device timely accounts the residual bandwidth of each physical stack port in the out-direction of the logic stack port according to the cycle, and sums up the residual bandwidth to obtain the residual bandwidth of all the physical stack ports. Of course, the modes of obtaining the residual bandwidth of the physical stack port are not limited to the above modes, and are not described in detail here.

It should be noted that, the Master device needs to obtain the residual bandwidth of the physical stack ports which are bound with all the logic stack ports on the forwarding path. When the above mode (1) is adopted, the mode of obtaining the residual bandwidth of the physical stack port is the same as that of the logic stack port In/1, and is not described in detail here.

In Step S603, the Master device obtains the minimum residual bandwidth of the main path and the minimum residual bandwidth of the backup path. Since in Step S602, the residual bandwidth is obtained according to the preset cycle; accordingly, every time the Master device obtains the residual bandwidth, the Master device needs to obtain the minimum residual bandwidth of the main path and the minimum residual bandwidth of the backup path, i.e. the Master device needs to obtain the minimum residual bandwidth of the main path and the minimum residual bandwidth of the backup path according to the preset cycle.

It should be noted that, the minimum residual bandwidth is the minimum residual bandwidth of all logic stack ports on the forwarding path, and is called as Current Bandwidth (CB) of the path. Since the main path and the backup path are determined when the network is originally established, in this step, the CB of the main path and the CB of the backup path can be obtained directly. In the present invention, the main path is from In/2 to L1/2 to L2/2 . . . to L N/2 to Out/1, and the backup path is from In/1 to R1/1 to R2/1 . . . to R M/1 to Out/2. Since the residual bandwidth of the physical stack ports of the In/2, L1/2, L2/2 . . . , In/1 and R1/1 has been obtained in Step S602, in this step, the Master device needs to obtain the minimum residual bandwidth of the physical stack port on the main path from In/2 to L1/2 to L2/2 . . . to L N/2 to Out/1. For example, the residual bandwidth of In/2 is 100M (the residual bandwidth of all the physical stack ports), the residual bandwidth of L1/2 is 200M, the residual bandwidth of L2/2 is 50M, the residual bandwidth of L3/2 is 100M, thus the minimum residual bandwidth, i.e. the CB, is 50M (there are three middle devices on the left ring).

Step S604: The Master device forwards the service flow from the ingress device to the egress device.

In the IRF stack, a forwarding table of the existed service flow has been established (for example, a two-layer forwarding table or a three-layer forwarding table have been established), as shown in Table 1.

TABLE 1

| Ingress device | Egress device | Network segment | Service flow | Forwarding path |
|---|---|---|---|---|
| Unit1 | Unit2 | A.C.0.0 | N1 | Master |
| Unit1 | Unit2 | B.A.0.0 | N2 | Master |
| Unit1 | Unit2 | B.B.0.0 | N3 | Backup |
| Unit1 | Unit2 | C.0.0.0 | N4 | Backup |

It can be seen from Table 1, the ingress device is Unit1, two logic stack ports are respectively In/1 and In/2, the egress device is Unit2, and two logic stack ports are respectively Out/1 and Out/2. A source address of existed service flow 1 is A.C.0.0, the quantity of the service flow 1 is N1, and the used path is the main path; a source address of service flow 2 is B.A.0.0, the quantity of the service flow 2 is N2, and the used path is the main path; a source address of service flow 3 is B.B.0.0, the quantity of the service flow 3 is N3, and the used path is the backup path; a source address of service flow 4 is C.0.0.0, the quantity of the service flow 4 is N4, and the used path is the backup path. When the service flow 1 enters through the ingress device, the service flows 1 is forwarded to the egress through the main path.

It should be noted that, the existed service flow may cause the load-imbalance of the forwarding path. For example, in a certain time interval, the service flow from the network segment A.C.0.0 increases rapidly, and thus the forwarding path corresponding to the network segment is congested, i.e. the main path is congested.

In order to solve the above problem, the CB of the main path and the CB of the backup bath are checked in real-time (i.e. according to the preset cycle). When the CB of the main path is larger than a preset Main forward Threshold (MFT), the main path is not congested, and the service flow may be forwarded through the main path. The value of the MFT may be preset according to practical requirements, e.g. the MFT is preset as 20M.

Further, when the CB of the main path is smaller than (or equals to) the preset MFT, the main path is congested, and the CB of the backup path needs to be checked. When the CB of the backup path is larger than a preset Second forward Threshold (SFT), the backup path is not congested, and the service flow on the main path can be automatically switched to the backup path. The value of the SFT may be preset according to practical requirements, e.g. the SFT is preset as 40M. It should be noted that, it is needed to determine whether minimum character flow on the main path is smaller than the CB of the backup path; if the minimum character flow on the main path is smaller than the CB of the backup path, the minimum character flow is switched to the backup path, so that small flow is not interrupted by larger flow and the backup path will not be congested, thereby improving the efficiency of the load-sharing.

For newly added service flow of the ingress device (the newly added service flow accesses the IRF stack through the above Unit 1, i.e. the Unit 1 is the ingress port), a forwarding table of the newly added service flow has not been established in the IRF stack, the egress device can be obtained according to egress port information contained in the service flow. It is taken as an example that the egress device is the above Unit 2. The Master device determines a main path and a backup path according to the ingress device and the egress device and checks the CB of the main path. If the CB of the main path is larger than the MFT, the newly added service flow is forwarded to the egress device through the main path; if the CB of the main path is smaller than the MFT, it is needed to check the current bandwidth of the backup path; if the current bandwidth of the backup path is larger than the SFT, the newly added service flow is forwarded through the backup path, otherwise, the service flow is still forwarded through the main path.

It should be noted that, when the forwarding path is established, the information corresponding to the service flow needs to be stored in the forwarding table as shown in Table 1. The information needing to be stored in the forwarding table includes the ingress device (Unit1), the egress device (Unit2), flow characters of the service flow (e.g. the source IP address of the service flow is stored in the network segment item of Table 1), the quantity of the service flow (the service flow item of Table 1), forwarding paths (the main path or the backup path), and the like.

In the present invention, in order to improve the whole forwarding efficiency, a timer needs to be configured to check the CB of the main path timely. When the CB of the main path is larger than the preset MFT, the service flow which is disturbed to the backup path previously is gradually switched to the main path (of course, if there is no service flow on the backup path, it is not needed to switch service flow).

It should be further noted, after checking the CB of the main path, the difference CB-MFT may be calculated. When the difference CB-MFT is larger than 0, the current minimum service flow among the service flow distributed to the backup path needs to be checked. For example, the minimum service flow is M1; if M1 is larger than the difference CB−MFT, the minimum service flow M1 on the backup path does not need to be switched to the main path; otherwise, the minimum service flow M1 on the backup path may be switched to the main path, i.e. the service flow on this network segment is switched to the main path to be forwarded through the main path, so as to ensure that most service flow is forwarded through the main path, thereby improving the forwarding efficiency.

In the present invention, in order to improve the whole forwarding efficiency, when the CB of the backup path is 0, the service flow on the backup path needs to be switched to the main path. Specifically, the minimum service flow on the backup path is switched to the main path by searching the forwarding table (e.g. the above Table 1) until the CB of the backup path is larger than 0 or until the service flow on the backup path is completely switched to the main path, so as to ensue that the service flow added to the backup path does not cause the congestion of the backup path. It should be noted that, for the whole IRF stack, the main path and the backup path are all composed of direct-connected paths, but the direct-connected paths of the backup path is longer than the direct-connected paths of the main path. When the backup path is congested, the forwarding path may be congested. In this case, more forwarding overhead is needed, so the congestion of the backup path needs to be avoided in the present invention at full steam.

The sequence of steps in the method of the present invention may be adjusted according to practical requirements.

As can be seen, in the present invention, the congestion states of the main path and the backup path are checked in real-time; when the main path is not congested, the main path is selected to forward the service flow; when the main path is congested and the backup path is not congested, the backup path is selected to forward the service flow, so as to implement the load-sharing in the IRF stack. When new service flow is added, the data may be forwarded through another path, which can improve the efficiency of the member devices in the IRF stack and solve the problem of the forwarding bottleneck to which the member devices face.

Figure 7:
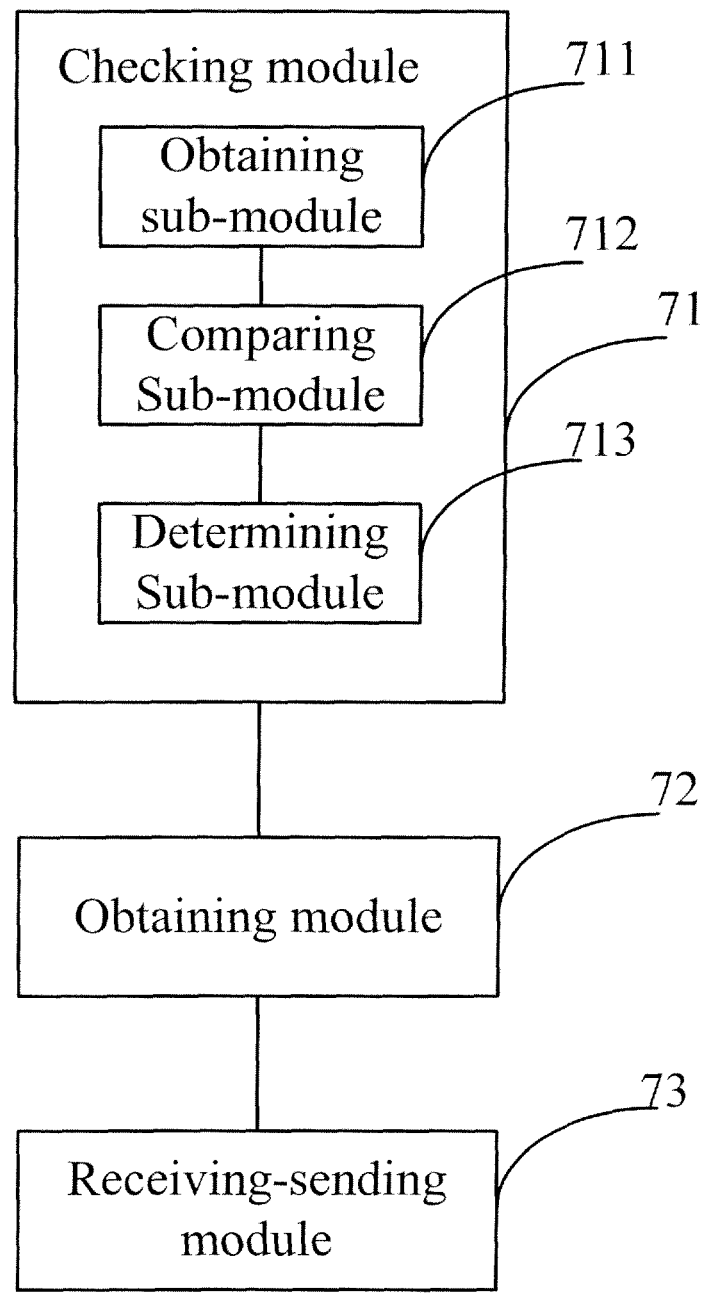
FIG. 7 is a schematic diagram illustrating a device of load-sharing in an IRF stack in accordance with an embodiment of the present invention.

The present invention further provides a device of load-sharing in an IRF stack, which is applied to a system including a Master device, an ingress device and an egress device. The ingress device is an IRF stack member for receiving service flow, the egress device is an IRF stack member for sending the service flow, and a critical forwarding path between the ingress device and the egress device is a main path, and other paths are backup paths. As shown in FIG. 7, the device includes the following modules.

A checking module 71 is adapted to check a congestion state of the main path.

Further, the checking module 71 includes:
an obtaining sub-module 711, adapted to obtain current bandwidth of the main path; where the current bandwidth is minimum residual bandwidth of all logic stack ports on the main path;
a comparing sub-module 712, electrically connected with the obtaining sub-module 711 and adapted to compare the current bandwidth obtained by the obtaining sub-module 711 with a preset main forwarding threshold;
a determining sub-module 713, electrically connected with the comparing sub-module 712 and adapted to determine the congestion state of the main path according to a comparing result;
when the current bandwidth is larger than the preset main forwarding threshold, adapted to determine that the main path is not congested; otherwise, determine that the main path is congested;
an obtaining module 72, electrically connected with the checking module 71 and adapted to obtain a path for forwarding the service flow according to the congestion state of the main path checked by the checking module 71; where, the path is the main path or a backup path.

Specifically, the obtaining module 72 is adapted to obtain the main path as the path for forwarding the service flow when the congestion state of the main path indicates that the main path is not congested; and
obtain the path for forwarding the service flow according to the congestion state of the backup path when the congestion state of the main path indicates that the main path is congested.

The obtaining module 72 is further adapted to obtain the current bandwidth of the backup path, compare the current bandwidth of the backup path with a preset SFT, and determine the congestion state of the backup path according to a comparing result; when the current bandwidth of the backup path is larger the preset SFT, the congestion state of the backup path indicates that the backup path is not congested, and adapted to obtain the backup path as the path for forwarding the service flow; otherwise, the congestion state of the backup path indicates that the backup path is congested, and obtain the main path as the path for forwarding the service flow.

It should be noted that, the obtaining module 72 is further adapted to obtain the current bandwidth of the main path according to a preset cycle; when the current bandwidth of the main path is larger than the preset MFT, adapted to calculate the difference between the current bandwidth of the main path and the preset MFT, and compare minimum service flow among the service flow on the backup path with the difference; when the minimum service flow is smaller than the difference, adapted to switch the minimum service flow on the backup path to the main path.

The obtaining module 72 is further adapted to, when the current bandwidth of the backup path equals to a preset first value, switch the minimum service flow on the backup path to the main path until the current bandwidth of the backup path equals to a preset second value or until there is no service flow on the backup path.

The device of load-sharing further includes: a receiving-sending module 73, electrically connected with the obtaining module 72 and adapted to forward the service flow to the egress device through the main path or the backup path obtained by the obtaining module 72 to implement the load-sharing in the IRF stack.

The modules in the device of the present invention may be integrated or separated. The above modules may be combined as one module or be further split into multiple sub-modules.

According to the description of the above embodiments, those skilled in the art may clearly learn that the present invention may be implemented through hardware or through software and a necessary general hardware platform. Based on this understanding, the technical solution of the present invention may be incarnated through a software product, and the software product may be stored in a nonvolatile storage medium (e.g. a CD-ROM, a USB disk, a moveable hard disk etc.) and include several instructions to make a computer device (e.g. a personal computer, a server, a network device etc.) execute the method described by the embodiments of the present invention.

Those skilled in the art can understand that the figures are merely schematic diagrams illustrating preferable embodiments, and the modules and flows in the figures are not always necessary in the embodiments of the present invention.

Those skilled in the art can understand that the modules in the device of the embodiments may be distributed in the device of the embodiments or in one or more devices different from the device of the embodiments. The above modules in the embodiments may be combined into one module or be further split into multiple sub-modules.

The above sequence numbers are merely used for description and do not indicate the order of quality of the embodiments.

The above disclosures merely are several detail embodiments of the present invention, but the present invention is not limited to the above embodiments, and the changes and variations which can be made by those skilled in the art should belong to the protection scope of the present invention.

The invention claimed is:

1. A method of load-sharing in an Intelligent Resilient Framework (IRF) stack, applied to a system comprising a Master device, an ingress device and an egress device, the ingress device being an IRF stack member for receiving service flow, the egress device being an IRF stack member for sending the service flow, and a critical forwarding path between the ingress device and the egress device being a main path, and other paths being backup paths, comprising:
checking, by the Master device, a congestion state of the main path;
obtaining, by the Master device, a path for forwarding the service flow according the congestion state of the main path, and the path being the main path or a backup path; and
forwarding, by the Master device, the service flow to the egress device through the main path or the backup path.

2. The method of claim 1, further comprising:
before checking the congestion state of the main path,
determining, by the Master device, the main path and the backup path according to the ingress device and the egress device recorded in a forwarding table of the service flow when the forwarding table is stored in the IRF stack.

3. The method of claim 1, further comprising:
before checking the congestion state of the main path,
obtaining, by the Master device, the ingress device and the egress device according to the service flow when a forwarding table of the service flow is not stored in the IRF stack, determining the main path and the backup path according to the ingress device and the egress device, and storing the forwarding table of the service flow in the IRF stack.

4. The method of claim 1, wherein checking, by the Master device, a congestion state of the main path comprises:
  obtaining, by the Master device, current bandwidth of the main path, the current bandwidth being minimum residual bandwidth of all logic stack ports on the main path;
  comparing, by the Master device, the current bandwidth and a preset main forwarding threshold, and determining the congestion state of the main path according to a comparing result; and
  when the current bandwidth is larger than the main forwarding threshold, the congestion state of the main path indicates that the main path is not congested; otherwise, the congestion state of the main path indicates that the main path is congested.

5. The method of claim 4, wherein obtaining, by the Master device, a path for forwarding service flow according the congestion state of the main path comprises:
  obtaining, by the Master device, the main path as the path for forwarding the service flow when the congestion state of the main path indicates that the main path is not congested; obtaining, by the Master device, the path for forwarding the service flow according to a congestion state of the backup path when the congestion state of the main path indicates that the main path is congested.

6. The method of claim 5, wherein obtaining, by the Master device, the path for forwarding the service flow according to the congestion state of the backup path comprises:
  obtaining, by the Master device, current bandwidth of the backup path;
  comparing the current bandwidth of the backup path with a preset secondary forwarding threshold, and determining the congestion state of the backup path according to a compare result;
  when the current bandwidth of the backup path is larger than the secondary forwarding threshold, the congestion state of the backup path indicating that the backup path is not congested, and obtaining, by the Master device, the backup path as the path for forwarding the service flow; and
  otherwise, the congestion state of the backup path indicating that the backup path is congested, and obtaining, by the Master device, the main path as the path for forwarding the service flow.

7. The method of claim 6, further comprising:
  after obtaining the backup path as the path for forwarding the service flow,
  obtaining, by the Master device, the current bandwidth of the main path according to a preset cycle;
  when the current bandwidth of the main path is larger than the preset main forwarding threshold, calculating, by the Master device, difference between the current bandwidth of the main path and the preset main forwarding threshold;
  comparing, by the Master device, minimum service flow among the service flow on the backup path with the difference; and
  if the minimum service flow is smaller than the difference, switching, by the Master device, the minimum service flow to the main path.

8. The method of claim 6, further comprising:
  after obtaining the backup path as the path for forwarding the service flow,
  when the current bandwidth of the backup path equals to a preset first value, switching, by the Master device, minimum service flow on the backup path to the main path until the current bandwidth of the backup path equals to a preset second value or until there is no service flow on the backup path.

9. A device of load-sharing in an Intelligent Resilient Framework (IRF) stack, applied to a system comprising a Master device, an ingress device and an egress device, the ingress device being an IRF stack member for receiving service flow, the egress device being an IRF stack member for sending the service flow, and a critical forwarding path between the ingress device and the egress device being a main path, and other paths being backup paths, comprising a processor coupled to a memory storing instructions for execution by the processor and further comprising:
  a checking module, to check a congestion state of the main path;
  an obtaining module, electrically connected with the checking module and to obtain a path for forwarding the service flow according to the congestion state of the main path checked by the checking module, the path being the main path or a backup path; and
  a receiving-sending module, electrically connected with the obtaining module and to forward the service flow to the egress device through the main path or the backup path obtained by the obtaining module.

10. The device of claim 9, wherein the checking module comprises:
  an obtaining sub-module, to obtain current bandwidth of the main path, the current bandwidth being minimum residual bandwidth of all logic stack ports on the main path;
  a comparing sub-module, electrically connected with the obtaining sub-module and to compare the current bandwidth obtained by the obtaining sub-module with a preset main forwarding threshold;
  a determining sub-module, electrically connected with the comparing sub-module and to determine the congestion state of the main path according to a comparing result; and
  when the current bandwidth is larger than the preset main forwarding threshold, determine that the main path is not congested; otherwise, determine that the main path is congested.

11. The device of claim 10, wherein the obtaining module is to obtain the main path as a path for forwarding the service flow when the congestion state of the main path indicates that the main path is not congested; and
  obtain the path for forwarding the service flow according to a congestion state of the backup path when the congestion state of the main path indicates that the main path is congested.

12. The device of claim 11, wherein the obtaining module is further to obtain current bandwidth of the backup path, compare the current bandwidth of the backup path with a preset Secondary Forward Threshold (SFT), and determine the congestion state of the backup path according to a comparing result; when the current bandwidth of the backup path is larger the preset SFT, determine that the congestion state of the backup path indicates that the backup path is not congested, and obtain the backup path as the path for forwarding the service flow; otherwise, determine that the congestion state of the backup path indicates that the backup path is congested, and obtain the main path as the path for forwarding the service flow.

13. The device of claim 12, wherein the obtaining module is further to obtain the current bandwidth of the main path according to a preset cycle; when the current bandwidth of the main path is larger than a preset Main Forward Threshold (MFT), calculate difference between the current bandwidth of the main path and the preset MFT, and compare minimum service flow among the service flow on the backup path with the difference; when the minimum service flow is smaller than the difference, switch the minimum service flow on the backup path to the main path.

14. The device of claim 12, wherein the obtaining module is further to switch the minimum flow on the backup path to the main path when the current bandwidth of the backup path equals to a preset first value, until the current bandwidth of the backup path equals to a preset second value or until there is no service flow on the backup path.

* * * * *

UNITED STATES PATENT AND TRADEMARK OFFICE
CERTIFICATE OF CORRECTION

PATENT NO.        : 8,438,307 B2                                Page 1 of 1
APPLICATION NO.   : 12/787794
DATED             : May 7, 2013
INVENTOR(S)       : Pin Wu et al.

It is certified that error appears in the above-identified patent and that said Letters Patent is hereby corrected as shown below:

In the Specification

In column 1, line 8, delete "200910158006M," and insert -- 200910158006.0, --, therefor.

Signed and Sealed this
Twentieth Day of August, 2013

Teresa Stanek Rea
*Acting Director of the United States Patent and Trademark Office*